United States Patent
Yamazaki

(10) Patent No.: US 10,321,370 B2
(45) Date of Patent: Jun. 11, 2019

(54) MOBILE COMMUNICATION SYSTEM, USER TERMINAL, BASE STATION, PROCESSOR, AND COMMUNICATION CONTROL METHOD

(71) Applicant: KYOCERA CORPORATION, Kyoto (JP)

(72) Inventor: Chiharu Yamazaki, Ota-ku (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/439,013

(22) PCT Filed: Oct. 11, 2013

(86) PCT No.: PCT/JP2013/077819
§ 371 (c)(1),
(2) Date: Apr. 28, 2015

(87) PCT Pub. No.: WO2014/069223
PCT Pub. Date: May 8, 2014

(65) Prior Publication Data
US 2015/0312821 A1    Oct. 29, 2015

Related U.S. Application Data

(60) Provisional application No. 61/719,623, filed on Oct. 29, 2012.

(51) Int. Cl.
*H04W 36/02* (2009.01)
*H04W 72/12* (2009.01)
*H04W 76/14* (2018.01)

(52) U.S. Cl.
CPC ..... *H04W 36/023* (2013.01); *H04W 72/1284* (2013.01); *H04W 76/14* (2018.02)

(58) Field of Classification Search
None
See application file for complete search history.

(56) References Cited

U.S. PATENT DOCUMENTS

| 8,873,475 | B2 | 10/2014 | Ono |
| 2010/0135233 | A1 | 6/2010 | Ono |
| 2013/0107722 | A1 | 5/2013 | Huang |
| 2014/0023008 | A1 | 1/2014 | Ahn et al. |

(Continued)

FOREIGN PATENT DOCUMENTS

| JP | 2010-114681 A | 5/2010 |
| JP | 2010-533429 A | 10/2010 |

(Continued)

OTHER PUBLICATIONS

International Search Report; PCT/JP2013/077819; dated Jan. 7, 2014.

(Continued)

*Primary Examiner* — Adnan Baig
(74) *Attorney, Agent, or Firm* — Studebaker & Brackett PC

(57) ABSTRACT

A mobile communication system includes a user terminal that performs D2D communication under management of a base station, the D2D communication indicating direct device to device communication. The user terminal transmits a D2D buffer status report indicating an amount of non-transmitted data in the D2D communication to the base station.

13 Claims, 14 Drawing Sheets

(56) References Cited

U.S. PATENT DOCUMENTS

| | | | |
|---|---|---|---|
| 2014/0038629 A1* | 2/2014 | Iwamura | H04W 24/10 455/452.1 |
| 2014/0206372 A1* | 7/2014 | Zeng | H04W 76/023 455/450 |
| 2014/0206732 A1* | 7/2014 | Farber | A61K 9/06 514/390 |
| 2015/0201401 A1* | 7/2015 | Lahetkangas | H04L 1/0079 370/329 |
| 2015/0312821 A1 | 10/2015 | Yamazaki | |
| 2016/0044098 A1 | 2/2016 | Li et al. | |
| 2018/0007677 A1 | 1/2018 | Seo et al. | |

FOREIGN PATENT DOCUMENTS

| | | | | |
|---|---|---|---|---|
| JP | 5952422 | | 6/2016 | |
| WO | 2011/160480 | A1 | 12/2011 | |
| WO | 2012/091420 | A2 | 7/2012 | |
| WO | 2012/128505 | A2 | 9/2012 | |
| WO | 2012/144320 | A1 | 10/2012 | |
| WO | WO-2012144320 | A1 * | 10/2012 | ............ H04W 24/10 |
| WO | 2013/044718 | A1 | 4/2013 | |
| WO | WO-2013044718 | A1 * | 4/2013 | ........ H04W 72/0453 |

OTHER PUBLICATIONS

3GPP TR 22.803 V0.3.0 (May 2012); 3rd Generation Partnership Project; Technical Specification Group SA; Feasibility Study for Proximity Services (ProSe)(Release 12).

An Office Action issued by the Japanese Patent Office dated Feb. 9, 2016, which corresponds to Japanese Patent Application No. 2014-544415 and is related to U.S. Appl. No. 14/439,013; with statement of relevance.

The extended European search report issued by the European Patent Office dated Jun. 9, 2016, which corresponds to European Patent Application No. 13851844.4-1854 and is related to U.S. Appl. No. 14/439,013.

Eldad Zeira, "Application reference for PAC," IEEE P802. 15-12-0230-01-0008, May 2012, 14 pp.

Etri, "A proposal for potential technologies for Release 12 and onwards," 3GPP RAN Workshop on Release 12 and onwards, RWS-120026, Ljubljana, Slovenia, Jun. 11-12, 2013, 13 pp.

An Office Action issued by the Japanese Patent Office dated Jan. 31, 2017, which corresponds to Japanese Patent Application No. 2017-007775 and is related to U.S. Appl. No. 14/439,013; with concise statement of relevance; 3pp.

* cited by examiner

FIG.8

| PUCCH | PUCCH | PUSCH | | PUCCH | PUCCH |
|-------|-------|-------|-------|-------|-------|
| PUCCH | PUCCH | PUSCH | | PUCCH | PUCCH |
| PUCCH | PUCCH | PUSCH | | PUCCH | PUCCH |
| PUCCH | PUCCH | PUSCH | | PUCCH | PUCCH |
| PUCCH | PUCCH | PUSCH | | PUCCH | PUCCH |
| PUCCH | PUSCH | D2D/Rx | PUSCH | PUCCH | |
| PUCCH | PUSCH | | PUCCH | | |
| PUCCH | PUSCH | D2D/Tx | PUSCH | PUCCH | |
| PUCCH | PUSCH | | PUCCH | | |

0 → #9

DESTINATION ID

BUFFER SIZE    OCT 1

1001 → REPRESENT BRS DESTINED TO UE #0 AND UE #3
(UE #1 AND UE #2 ARE NOT CONCERNED)

MOBILE COMMUNICATION SYSTEM, USER TERMINAL, BASE STATION, PROCESSOR, AND COMMUNICATION CONTROL METHOD

TECHNICAL FIELD

The present invention relates to a mobile communication system that supports D2D communication.

BACKGROUND ART

In a 3GPP (3rd Generation Partnership Project) which is a project aiming to standardize a mobile communication system, the introduction of Device to Device (D2D) communication is discussed as a new function after Release 12 (see non patent document 1).

In the D2D communication, a plurality of adjacent user terminals directly perform data communication in a frequency band assigned to the mobile communication system without a core network. It is noted that the D2D communication is also called Proximity Service communication.

PRIOR ART DOCUMENT

Non-Patent Document

Non Patent Document 1: 3GPP technical report "TR 22.803 V0.3.0" May 2012.

SUMMARY OF THE INVENTION

In the current state, there is no designed specification for appropriately controlling D2D communication.

Therefore, the present invention provides a mobile communication system capable of appropriately controlling D2D communication.

According to one embodiment, a mobile communication system includes a user terminal that performs D2D communication under management of a base station, the D2D communication indicating direct device to device communication. The user terminal transmits a D2D buffer status report indicating an amount of non-transmitted data in the D2D communication to the base station.

BRIEF DESCRIPTION OF THE DRAWINGS

FIG. 8 is a diagram for illustrating D2D scheduling according to an embodiment.

DESCRIPTION OF THE EMBODIMENT

Overview of Embodiment

Figure 1:
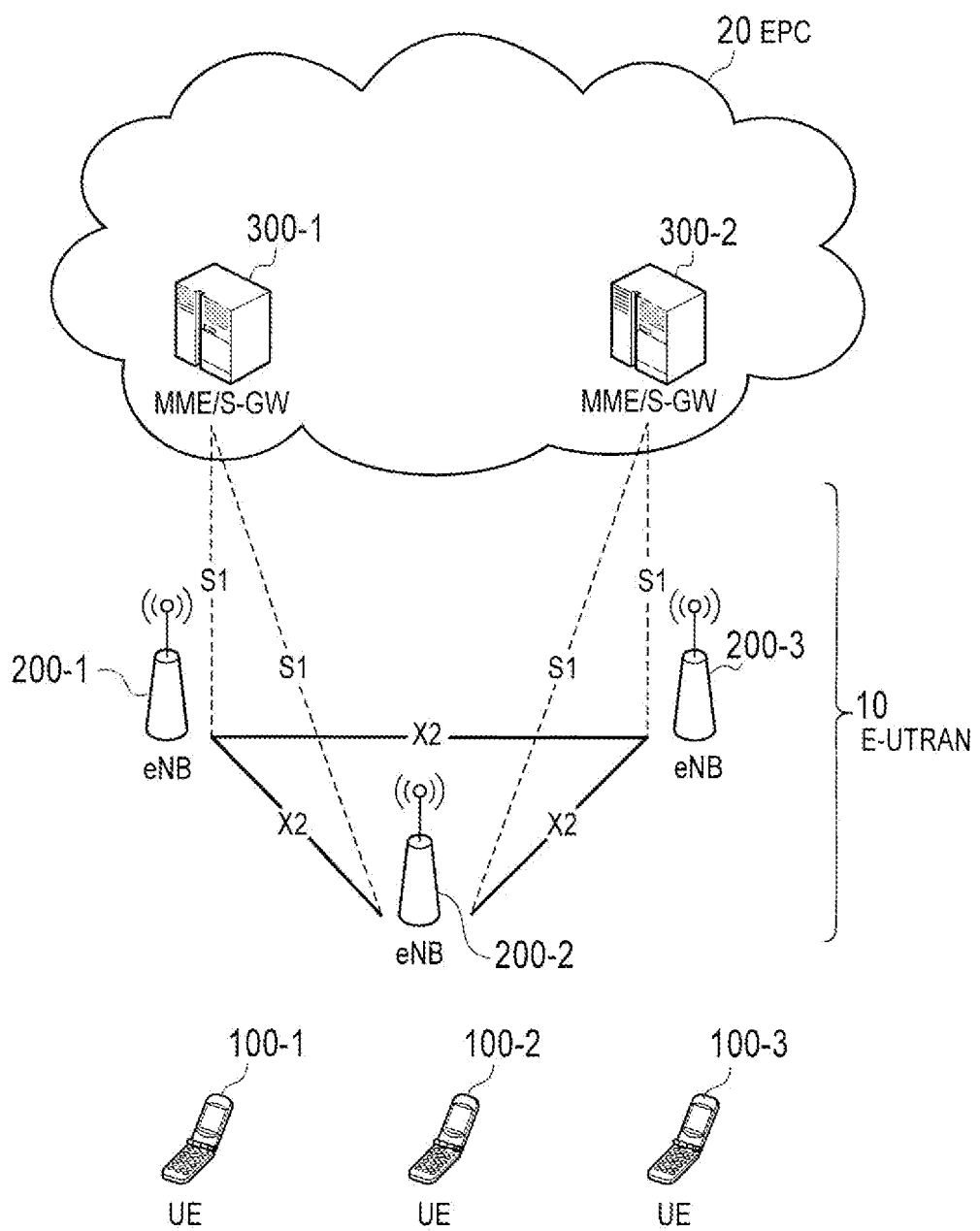
FIG. 1 is a configuration diagram of an LTE system.

A mobile communication system according to an embodiment includes a user terminal that performs D2D communication, which is direct device to device communication, under management of a base station. The user terminal transmits a D2D buffer status report indicating the amount of non-transmitted data in the D2D communication to the base station. In this way, the base station is able to recognize the amount of the non-transmitted data in the D2D communication, thereby appropriately performing management (assignment and the like of a radio resource) of the D2D communication.

In the embodiment, the user terminal transmits the D2D buffer status report to the base station separately from a buffer status report indicating the amount of non-transmitted data in cellular communication with the base station. In this way, it is possible to recognize the amount of the non-transmitted data in the cellular communication separately from the amount of the non-transmitted data in the D2D communication.

In the embodiment, the user terminal includes a D2D buffer that temporarily accumulates the non-transmitted data in the D2D communication separately from a buffer that temporarily accumulates the non-transmitted data in the cellular communication. In this way, it is possible to manage the non-transmitted data in the cellular communication separately from the non-transmitted data in the D2D communication.

In the embodiment, when the base station performs the assignment of a radio resource that is used in the D2D communication, the base station performs the assignment of the radio resource, which is used in the D2D communication, and the assignment of a radio resource, which is used in the cellular communication, on the basis of the D2D buffer status report. In this way, it is possible to perform the efficient assignment of a radio resource in consideration of the amount of non-transmitted data in the D2D communication.

In the embodiment, when a communication partner terminal of the user terminal in the D2D communication performs the assignment of the radio resource that is used in the D2D communication, the base station transfers at least apart of the D2D buffer status report to the communication partner terminal. On the basis of at least the part of the D2D buffer status report transferred from the base station, the communication partner terminal performs the assignment of the radio resource that is used in the D2D communication. In this way, it is possible to perform the efficient assignment of a radio resource in consideration of the amount of non-transmitted data in the D2D communication.

In the embodiment, the D2D buffer status report includes a combination of the amount of non-transmitted data to the communication partner terminal of the user terminal in the D2D communication and identification information of the communication partner terminal. In this way, it is possible to recognize the amount of the non-transmitted data for each communication partner terminal in the D2D communication.

In the embodiment, the identification information indicates an identifier that is assigned for the D2D communication from the base station. In this way, it is possible to appropriately identify the communication partner terminal in the D2D communication.

In the embodiment, when there are a plurality of communication partner terminals, the identification information is configured to identify the plurality of communication partner terminals. In this way, even when there are a plurality of communication partner terminals in the D2D communication, it is possible to identify each of the communication partner terminals.

A user terminal according to the embodiment performs the D2D communication, which is direct device to device communication, under management of a base station. The user terminal includes a control unit that transmits a D2D buffer status report indicating the amount of non-transmitted data in the D2D communication to the base station.

A processor according to the embodiment is provided in a user terminal that performs D2D communication under management of abase station, the D2D communication indicating direct device to device communication. The processor performs: a process of transmitting, by the user terminal, a D2D buffer status report indicating an amount of non-transmitted data in the D2D communication to the base station.

A base station according to the embodiment manages D2D communication that is direct device to device communication by a user terminal. The base station comprises: a reception unit that receives a D2D buffer status report indicating an amount of non-transmitted data in the D2D communication from the user terminal.

A processor according to the embodiment is provided in a base station that manages D2D communication that is direct device to device communication by a user terminal. The processor performs: a process of receiving, by the base station, a D2D buffer status report indicating an amount of non-transmitted data in the D2D communication from the user terminal.

A communication control method according to the embodiment is used in a mobile communication system, which includes a user terminal that performs D2D communication under management of a base station, the D2D communication indicating direct device to device communication. The communication control method comprises: a step of transmitting, by the user terminal, a D2D buffer status report indicating an amount of non-transmitted data in the D2D communication to the base station.

Embodiment

Hereinafter, with reference to the accompanying drawings, description will be provided for an embodiment in which D2D communication is introduced to a mobile communication system (an LTE system) configured based on the 3GPP standards.

(LTE System)

FIG. 1 is a configuration diagram of the LTE system according to the present embodiment.

As illustrated in FIG. 1, the LTE system includes a plurality of UEs (User Equipments) 100, E-UTRAN (Evolved Universal Terrestrial Radio Access Network) 10, and EPC (Evolved Packet Core) 20. The EPC 20 corresponds to a core network.

The UE 100 is a mobile radio communication device and performs radio communication with a cell (a serving cell) with which a connection is established. The UE 100 corresponds to the user terminal.

The E-UTRAN 10 includes a plurality of eNBs 200 (evolved Node-Bs). The eNB 200 corresponds to a base station. The eNB 200 controls a cell and performs radio communication with the UE 100 that establishes a connection with the cell.

It is noted that the "cell" is used as a term indicating a minimum unit of a radio communication area, and is also used as a term indicating a function of performing radio communication with the UE 100.

The eNB 200, for example, has a radio resource management (RRM) function, a routing function of user data, and a measurement control function for mobility control and scheduling.

The EPC 20 includes a plurality of MME (Mobility Management Entity)/S-GWs (Serving-Gateways) 300.

The MME is a network node for performing various mobility controls, for example, for the UE 100 and corresponds to a controller. The S-GW is a network node that performs transfer control of user data and corresponds to a mobile switching center.

The eNBs 200 are connected mutually via an X2 interface. Furthermore, the eNB 200 is connected to the MME/S-GW 300 via an S1 interface.

Next, the configurations of the UE 100 and the eNB 200 will be described.

Figure 2:
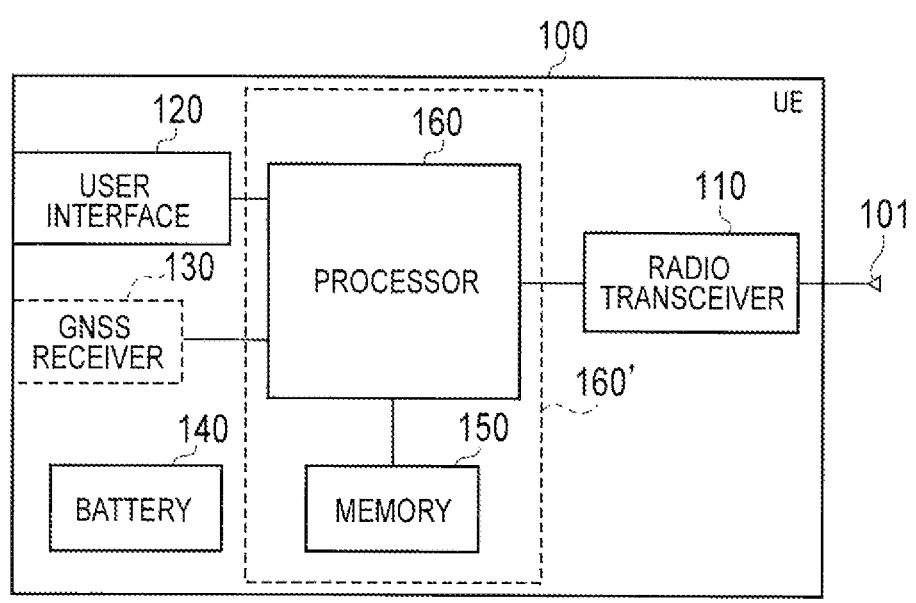
FIG. 2 is a block diagram of UE.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 constitute a control unit.

The UE 100 may not have the GNSS receiver 130. Furthermore, the memory 150 may be integrally formed with the processor 160, and this set (that is, a chipset) may be called a processor 160'.

The antenna 101 and the radio transceiver 110 are used to transmit and receive a radio signal. The antenna 101 includes a plurality of antenna elements. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates a power to be supplied to each block of the UE 100.

The memory 150 stores a program to be executed by the processor 160 and information to be used for a process by the processor 160.

The processor 160 includes a baseband processor that performs modulation and demodulation, encoding and decoding and the like of the baseband signal, and a CPU (Central Processing Unit) that performs various processes by executing the program stored in the memory 150. The processor 160 may further include a codec that performs coding and decoding of sound and video signals. The processor 160 implements various processes and various communication protocols described later.

Figure 3:
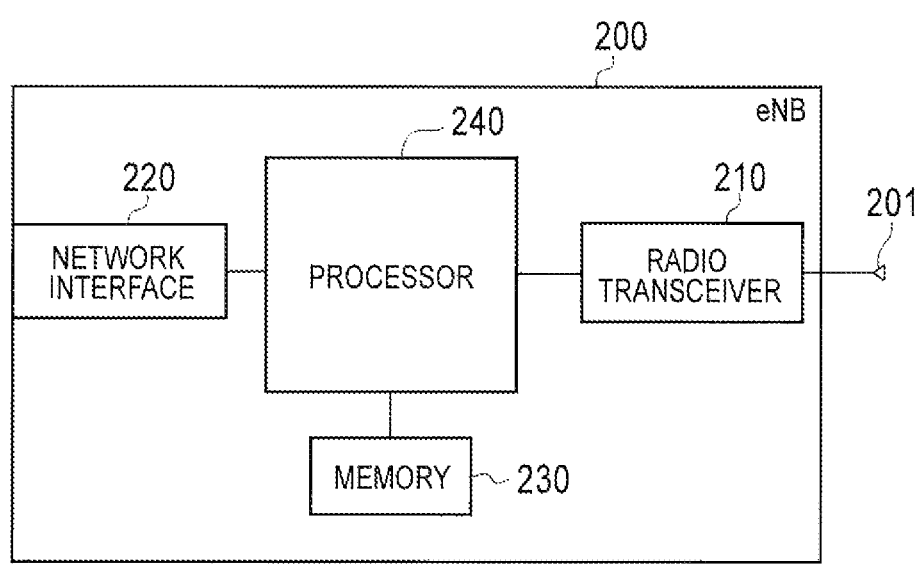
FIG. 3 is a block diagram of eNB.

FIG. 3 is a block diagram of the eNB 200. As illustrated in FIG. 3, the eNB 200 includes an antenna 201, a radio transceiver 210, a network interface 220, a memory 230, and a processor 240. The memory 230 and the processor 240 constitute a control unit. It is noted that the memory 230 may be integrally formed with the processor 240, and this set (that is, a chipset) may be called a processor.

The antenna 201 and the radio transceiver 210 are used to transmit and receive a radio signal. The antenna 201 includes a plurality of antenna elements. The radio transceiver 210 converts the baseband signal output from the processor 240 into the radio signal, and transmits the radio signal from the antenna 201. Furthermore, the radio transceiver 210 converts the radio signal received by the antenna 201 into the baseband signal, and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes the baseband processor that performs modulation and demodulation, encoding and decoding and the like of the baseband signal and a CPU that performs various processes by executing the program stored in the memory 230. The processor 240 implements various processes and various communication protocols described later.

Figure 4:
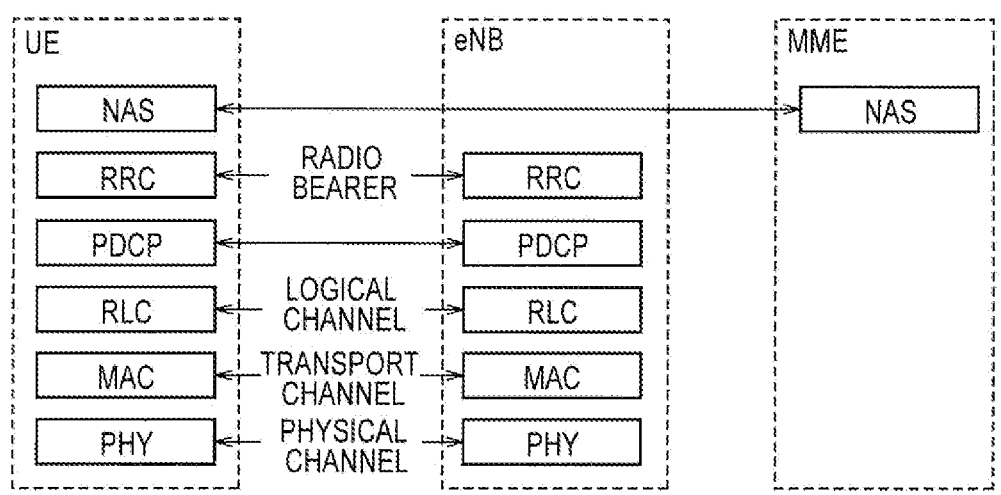
FIG. 4 is a protocol stack diagram of a radio interface in the LTE system.

FIG. 4 is a protocol stack diagram of a radio interface in the LTE system.

As illustrated in FIG. 4, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data is transmitted via the physical channel.

The MAC layer performs preferential control of data, and a retransmission process and the like by hybrid ARQ (an HARQ). Between the MAC layer of the UE 100 and the MAC layer of the eNB 200, data is transmitted via a transport channel. The MAC layer of the eNB 200 includes a MAC scheduler that determines an uplink and downlink transport format (a transport block size, a modulation and coding scheme and the like) and an assignment resource block.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control message (an RRC message) for various types of setting is transmitted. The RRC layer controls the logical channel, the transport channel, and the physical channel in response to establishment, re-establishment, and release of a radio bearer. When an RRC connection is established between the RRC of the UE 100 and the RRC of the eNB 200, the UE 100 is in a connection state, and when the RRC connection is not established, the UE 100 is in an idle state.

A NAS (Non-Access Stratum) layer positioned above the RRC layer performs session management or mobility management, for example.

Figure 5:
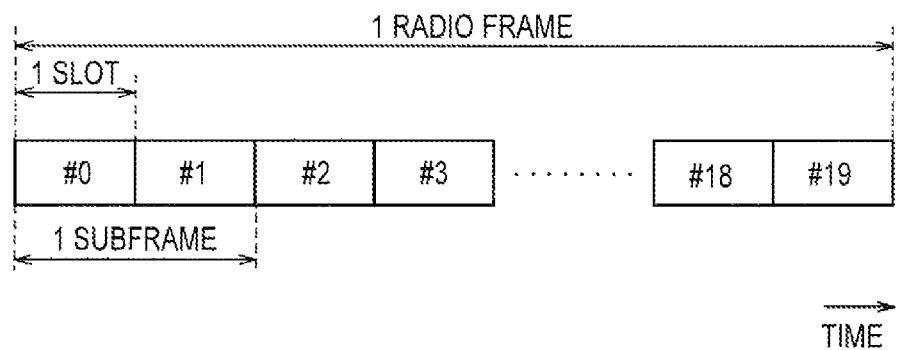
FIG. 5 is a configuration diagram of a radio frame used in the LTE system.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each symbol is provided at a head thereof with a guard interval called a cyclic prefix (CP). The resource block includes a plurality of subcarriers in the frequency direction.

Among radio resources assigned to the UE 100, a frequency resource can be designated by a resource block and a time resource can be designated by a subframe (or slot).

In the downlink, an interval of several symbols at the head of each subframe is a control region mainly used as a physical downlink control channel (PDCCH). Furthermore, the other interval of each subframe is a region mainly used as a physical downlink shared channel (PDSCH).

In the uplink, both end portions in the frequency direction of each subframe are control regions mainly used as a physical uplink control channel (PUCCH). Furthermore, the center portion, in the frequency direction, of each subframe is a region mainly used as a physical uplink shared channel (PUSCH).

(BSR)

In the LTE system, in order to efficiently assign an uplink radio resource to the UE 100, a buffer status report (BSR) for reporting a data amount of an uplink buffer (the amount of non-transmitted data of an uplink) to the eNB 200 is introduced.

The MAC layer of the UE 100 transmits BSR (hereinafter, "cellular BSR") to the MAC layer of the eNB 200 periodically or at a predetermined trigger. The cellular BSR indicates the amount of non-transmitted data of each logical channel group. Alternatively, the cellular BSR indicates the amount of non-transmitted data of all logical channel groups.

In the cellular BSR, two types of formats of a short format (Short BSR) and a long format (Long BSR) are defined. The Short BSR includes the total 1 octet of 2 bits for storing logical channel group ID and 6 bits indicating the amount of non-transmitted data. The Long BSR includes the total 3 octets and is used for reporting the amount of non-transmitted data of each logical channel group.

(D2D Communication)

The LTE system according to the present embodiment supports the D2D communication. Hereinafter, the D2D communication will be described in comparison with the normal communication (the cellular communication) of the LTE system.

In the cellular communication, the data path set between UEs passes through the EPC 20. On the other hand, in the D2D communication, the data path set between the UEs does not pass through the EPC 20.

Figure 6:
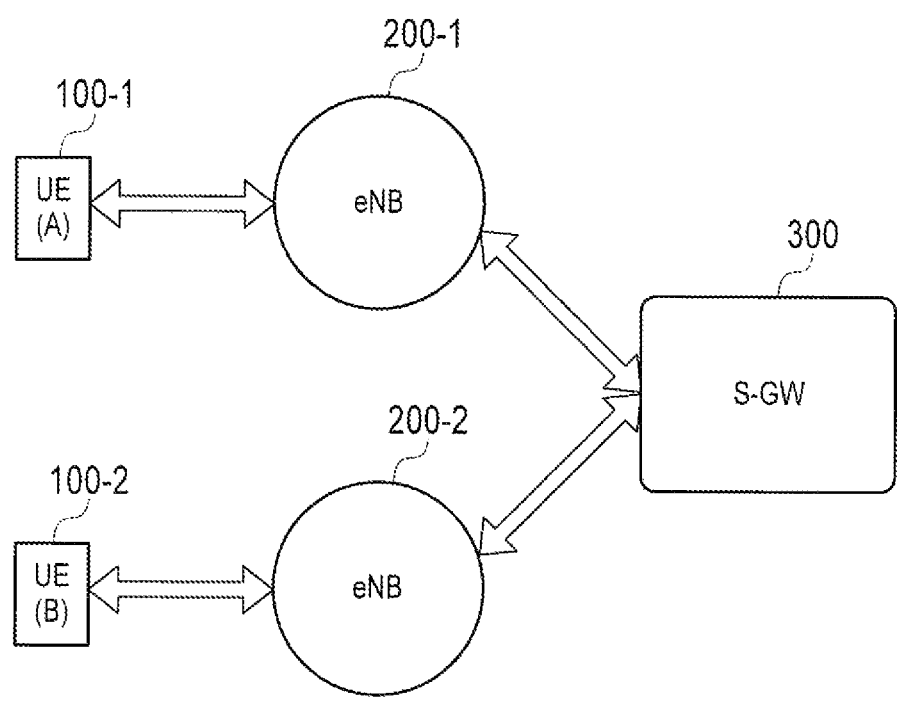
FIG. 6 is a diagram for illustrating a data path in cellular communication.

FIG. 6 illustrates a data path in the cellular communication. In this case, FIG. 6 illustrates the case in which the cellular communication is performed between UE 100-1 that establishes a connection with eNB 200-1 and UE 100-2 that establishes a connection with eNB 200-2. It is noted that the data path indicates a transfer path of user data (a user plane).

As illustrated in FIG. 6, the data path of the cellular communication passes through the EPC 20. Specifically, the data path is set to pass through the eNB 200-1, the S-GW 300, and the eNB 200-2.

Figure 7:
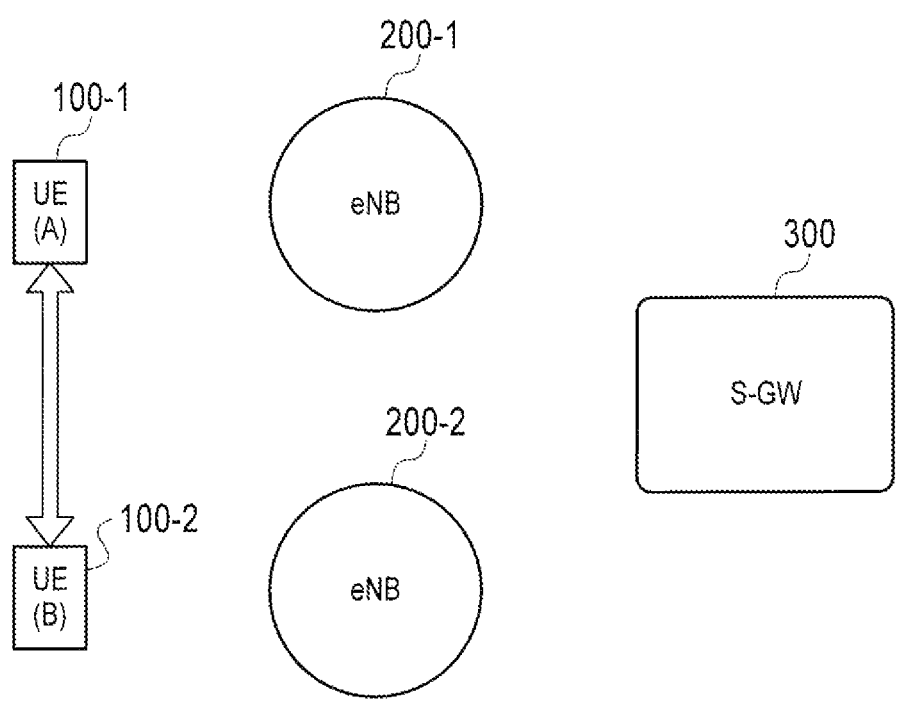
FIG. 7 is a diagram for illustrating a data path in D2D communication.

FIG. 7 illustrates an example of the data path in the D2D communication. In this case, FIG. 7 illustrates the case in which the D2D communication is performed between the UE 100-1 that establishes a connection with the eNB 200-1 and the UE 100-2 that establishes a connection with the eNB 200-2.

As illustrated in FIG. 7, the data path of the D2D communication does not pass through the EPC 20. In the D2D communication, two modes exist. One of them is a direct communication mode in which the data path does not pass through the eNB 200. The other mode is a local relay mode (Locally Routed mode) in which the data path passes through the eNB 200. In the present embodiment, the D2D communication in the direct communication mode will be mainly considered. However, the local relay mode may be employed.

As described above, when the UE 100-2 exists in the vicinity of the UE 100-1, the D2D communication is performed between the UE 100-1 and the UE 100-2, thereby obtaining an effect such as the reduction of a traffic load of the EPC 20 and a battery consumption amount of the UE 100.

It is noted that cases in which the D2D communication is started include (a) a case in which the D2D communication is started after a partner terminal is discovered by performing an operation for discovering a partner terminal, and (b) a case in which the D2D communication is started without performing an operation for discovering a partner terminal.

For example, in the above-described case (a), one UE 100 of the UE 100-1 and the UE 100-2 discovers the other UE 100 existing in the proximity of the one UE 100, so that the D2D communication is started.

In such a case, in order to discover the proximal terminal, the UE 100 has a (Discover)) function of discovering another UE 100 existing in the proximity of the UE 100, and/or a (Discoverable) function of being discovered by another UE 100.

For example, one UE of the UE 100-1 and the UE 100-2 transmits a signal for discovery (Discover signal) to the vicinity of the one UE, and the other UE receives the signal for discovery, so that the other UE discovers the one UE. Furthermore, the other UE transmits a response signal for the signal for discovery to the vicinity of the other UE and the one UE receives the response signal, so that the one UE discovers the other UE.

It is noted that the UE 100 need not necessarily perform the D2D communication even upon discovering a partner terminal. For example, after mutually discovering each other, the UE 100-1 and the UE 100-2 may perform a negotiation, and determine whether or not to perform the D2D communication. When each of the UE 100-1 and the UE 100-2 agrees to perform the D2D communication, the D2D communication starts.

On the other hand, in the above-described case (b), for example, the UE 100-1 starts broadcasting a signal for the D2D communication. Thus, the UE 100 is capable of starting the D2D communication regardless of the existence of the discovery of a partner terminal.

However, it is considered that the D2D communication is performed in a frequency band (that is, in a frequency band of the cellular communication) of the LTE system, and for example, in order to avoid interference to the cellular communication, the D2D communication is performed under the management of the eNB 200.

The D2D communication is performed in an uplink frequency band of the LTE system. In other words, the D2D communication is performed by using a part of uplink radio resources of the cellular communication.

Alternatively, the D2D communication is performed in a downlink frequency band of the LTE system. In other words, the D2D communication is performed by using a part of downlink radio resources of the cellular communication.

In the present embodiment, D2D scheduling, which is radio resource assignment for the D2D communication, is performed at the initiative of the eNB 200. In this case, the eNB 200 determines a radio resource (a D2D radio resource) that is assigned to the D2D communication. That is, the UE 100 has no selection right of the D2D radio resource. The eNB 200 notifies the UE 100 of the D2D radio resource assigned dynamically or quasi-statically. The UE 100 performs the D2D communication by using the assigned D2D radio resource.

FIG. 8 is a diagram for illustrating a detailed example when the D2D scheduling is performed at the initiative of the eNB. Hereinafter, a case is assumed that the D2D communication is performed by using a part of uplink radio resources of the cellular communication.

As illustrated in FIG. 8, the eNB 200 designates a specific resource block of a specific subframe as a D2D radio resource. In the example of FIG. 8, a part of resource blocks in a second subframe (a subframe #1) and a part of resource blocks in a fourth subframe (a subframe #3) within the radio frame are designated as D2D radio resources.

The UE 100 performing the D2D communication performs the D2D communication by using the D2D radio resource assigned from the eNB 200.

In addition, transmission (Tx) in the second subframe (the subframe #1) indicates that one UE 100 transmits in the D2D communication and the other UE 100 receives in the D2D communication. Reception (Rx) in the fourth subframe (the subframe #3) indicates that one UE 100 receives in the D2D communication and the other UE 100 transmits in the D2D communication.

(Operation According to First Embodiment)

Hereinafter, the operation according to the present embodiment will be described.

(1) Operation Overview

Figure 9:
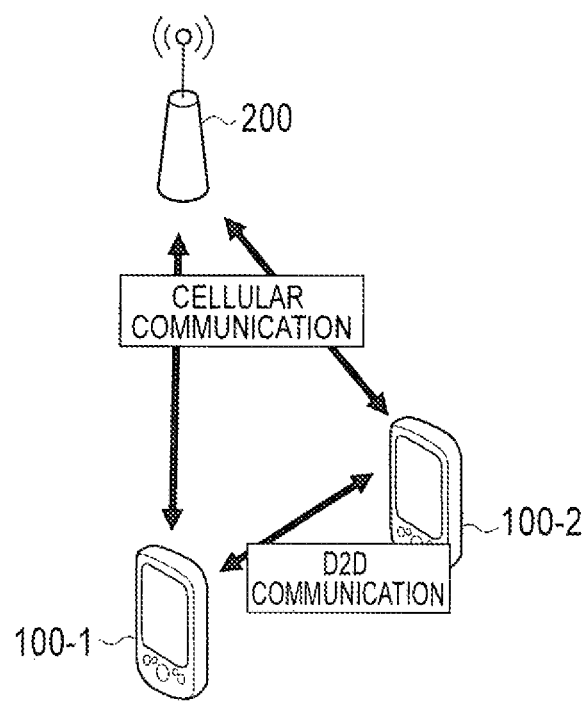
FIG. 9 is a diagram illustrating an operation environment according to the embodiment.

FIG. 9 is a diagram illustrating an operation environment according to the present embodiment.

As illustrated in FIG. 9, the case is considered, in which, in an operation environment having the eNB 200 and the UE 100-1 and the UE 100-2 that establish a connection with the eNB 200, the UE 100-1 and the UE 100-2 perform the D2D communication and the cellular communication. Specifically, the UE 100-1 and the UE 100-2 mutually transmit and receive data through the D2D communication and transmit and receive data to and from the eNB 200 through the cellular communication.

The eNB 200 assigns a radio resource (a D2D radio resource), which is used for the D2D communication, and a radio resource (a cellular radio resource), which is used for the cellular communication, to each of the UE 100-1 and the UE 100-2.

Furthermore, when the eNB 200 does not recognize the amount of non-transmitted data in the D2D communication with respect to each of the UE 100-1 and the UE 100-2, excess and deficiency may occur in the D2D radio resource. Furthermore, in terms of a hardware load of the UE 100, in the same UE 100, it is necessary to avoid radio resource assignment by which uplink data transmission in the cellular communication and data reception in the D2D communication are simultaneously performed.

In this regard, each of the UE 100-1 and the UE 100-2 transmits D2D-BSR indicating the amount of non-transmitted data in the D2D communication to the eNB 200. Specifically, each of the UE 100-1 and the UE 100-2 transmits the D2D-BSR to the eNB 200 separately from cellular BSR indicating the amount of non-transmitted data in the cellular communication. The D2D-BSR is transmitted periodically or at a predetermined trigger (for example, a trigger at which the amount of non-transmitted data was increased), similarly to the cellular BSR. The format of the D2D-BSR will be described later.

On the basis of the D2D-BSR, the eNB 200 performs the assignment of the radio resource (the D2D radio resource), which is used for the D2D communication, and the assignment of the radio resource (the cellular radio resource) that is used for the cellular communication. For example, in order to prevent excess and deficiency from occurring in the D2D radio resource, the eNB 200 assigns an appropriate amount of D2D radio resource on the basis of the D2D-BSR. Furthermore, on the basis of the D2D-BSR, the eNB 200 assigns at least one of the D2D radio resource and the cellular radio resource in order to prevent the uplink data transmission in the cellular communication and the data reception in the D2D communication from being simultaneously performed.

In addition, in order to allow a report of the cellular BSR and a report of the D2D-BSR to be compatible with each other, each of the UE 100-1 and the UE 100-2 manages the non-transmitted data in the cellular communication separately from the non-transmitted data in the D2D communication.

Figure 10:
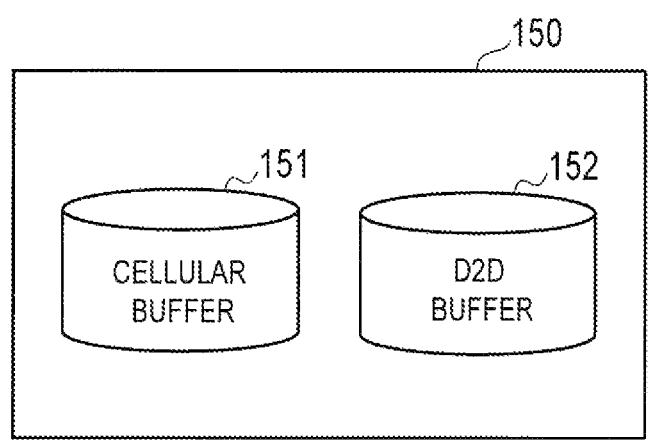
FIG. 10 is a diagram for illustrating a method of managing non-transmitted data according to the embodiment.

FIG. 10 is a diagram for illustrating a method of managing non-transmitted data according to the present embodiment.

As illustrated in FIG. 10, each of the UE 100-1 and the UE 100-2 includes a D2D buffer 152 that temporarily accumulates non-transmitted data in the D2D communication separately from a cellular buffer 151 that temporarily accumulates non-transmitted data in the cellular communication. The cellular buffer 151 and the D2D buffer 152 are provided in a memory 150.

The cellular buffer 151 accumulates the non-transmitted data for each logical channel group. On the other hand, the D2D buffer 152 accumulates the non-transmitted data for each communication partner UE of the D2D communication.

(2) D2D-BSR

Next, the format of the D2D-BSR will be described.

Figure 11:
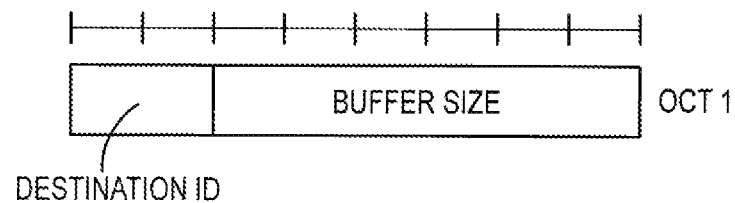
FIG. 11 is a diagram illustrating a format 1 of D2D-BSR according to the embodiment.

FIG. 11 is a diagram illustrating a format 1 of the D2D-BSR. In the format 1, the D2D-BSR includes 1 octet similarly to the short format (Short BSR) in the cellular BSR.

As illustrated in FIG. 11, the D2D-BSR according to the format 1 includes the total 1 octet of 2 bits for storing ID (identification information) of a communication partner UE of the D2D communication and 6 bits indicating the amount of non-transmitted data to the communication partner UE. Furthermore, the ID of the communication partner UE of the D2D communication indicates temporary ID (ID for the D2D communication) that is assigned for the D2D communication from the eNB 200. The ID is also used when control information for controlling the D2D communication is transmitted to the UEs 100.

Figure 12:
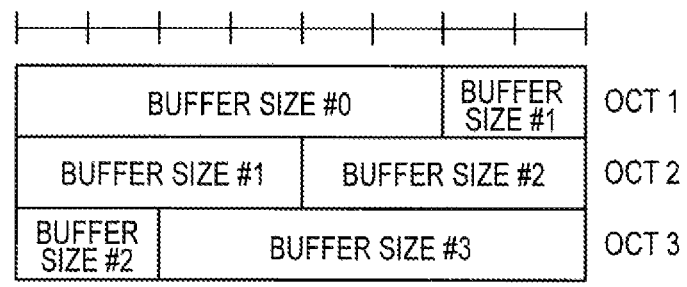
FIG. 12 is a diagram illustrating a format 2 of the D2D-BSR according to the embodiment.

FIG. 12 is a diagram illustrating a format 2 of the D2D-BSR. In the format 2, the D2D-BSR includes 3 octets similarly to the long format (Long BSR) in the cellular BSR.

As illustrated in FIG. 12, the D2D-BSR according to the format 2 includes fields indicating the amount of non-transmitted data to a communication partner UE in sequence of ID (identification information) of the communication partner UE of the D2D communication. Furthermore, the ID of the communication partner UE of the D2D communication indicates temporary ID (ID for the D2D communication) that is assigned for the D2D communication from the eNB 200. The ID is also used when control information for controlling the D2D communication is transmitted to the UEs 100.

In addition, the example of FIG. 12 considers the case in which the number of fields of a buffer size is four (#0 to #3), that is, the case in which the number of the communication partner UEs of the D2D communication is four. However, the number of the fields is changed in response to the number of the communication partner UEs of the D2D communication.

(3) Operation Sequence

Figure 13:
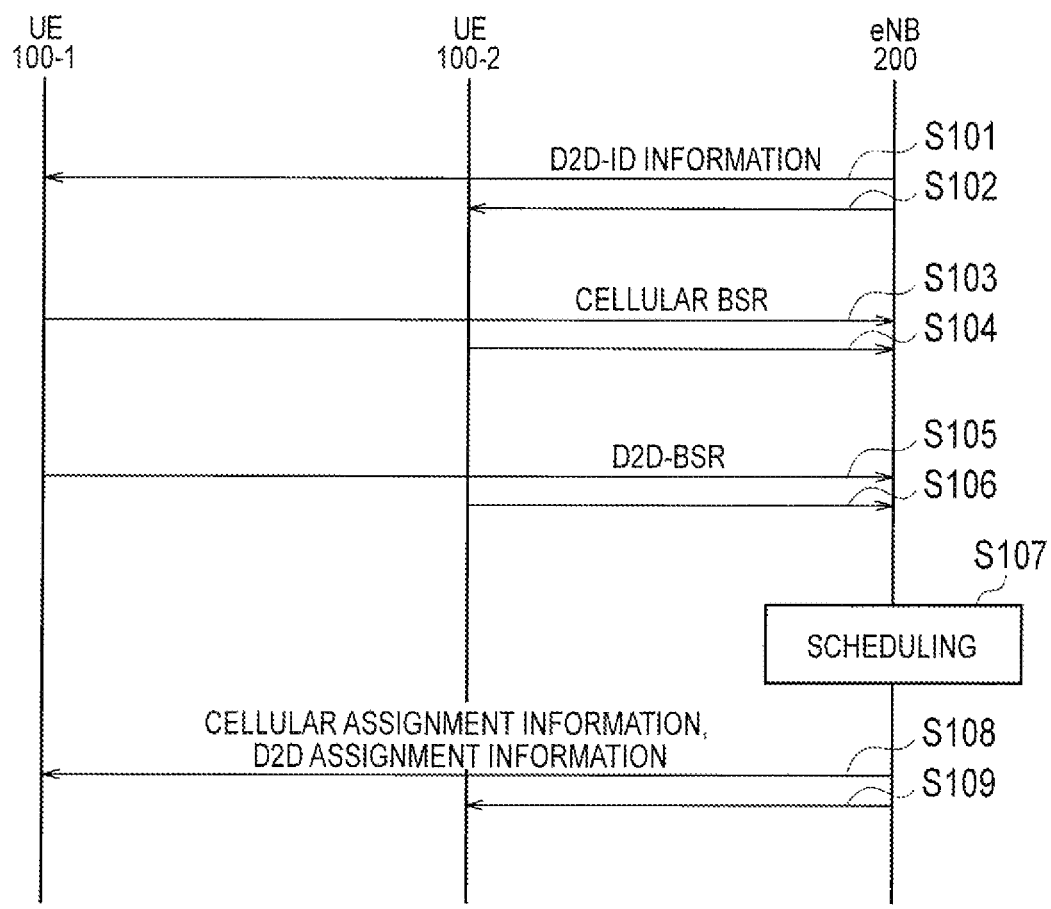
FIG. 13 is an operation sequence diagram according to the embodiment.

FIG. 13 is an operation sequence diagram according to the present embodiment. Hereinafter, the case, in which the D2D communication starts when each of the UE 100-1 and the UE 100-2 performs the cellular communication, is considered.

As illustrated in FIG. 13, in step S101, the eNB 200 notifies the UE 100-1 of ID#1 for the D2D communication of the UE 100-1 and ID#2 for the D2D communication of the UE 100-2. Then, the UE 100-1 associates non-transmitted data to the UE 100-2 in the D2D communication with the ID#2, and accumulates the associated resultant in the D2D buffer 152 of the UE 100-1.

In step S102, the eNB 200 transmits information indicating the ID#2 for the D2D communication to the UE 100-2. On the basis of the information, the UE 100-2 stores the ID#2 for the D2D communication. Then, the UE 100-2 associates non-transmitted data to the UE 100-1 in the D2D communication with the ID#1, and accumulates the associated resultant in the D2D buffer 152 of the UE 100-2.

In addition, the eNB 200 may perform the instruction of the format of the D2D-BSR as well as the notification of the ID for the D2D communication. Specifically, the eNB 200 may instruct each of the UE 100-1 and the UE 100-2 whether to use the D2D-BSR of the short format or the D2D-BSR of the long format.

In step S103, the UE 100-1 transmits the cellular BSR to the eNB 200 on the basis of the amount of non-transmitted data accumulated in the cellular buffer 151 of the UE 100-1.

In step S104, the UE 100-2 transmits the cellular BSR to the eNB 200 on the basis of the amount of non-transmitted data accumulated in the cellular buffer 151 of the UE 100-2.

In step S105, the UE 100-1 transmits the D2D-BSR to the eNB 200 on the basis of the amount of non-transmitted data accumulated in the D2D buffer 152 of the UE 100-1. In the present sequence, since the communication partner UE of the UE 100-1 in the D2D communication is only the UE 100-2, the D2D-BSR of the short format is available. In this case, the D2D-BSR includes the ID#2 for the D2D communication of the UE 100-2 and the information indicating the amount of non-transmitted data to the UE 100-2.

In step S106, the UE 100-2 transmits the D2D-BSR to the eNB 200 on the basis of the amount of non-transmitted data accumulated in the D2D buffer 152 of the UE 100-2. In the present sequence, since the communication partner UE of the UE 100-2 in the D2D communication is only the UE 100-1, the D2D-BSR of the short format is available. In this case, the D2D-BSR includes the ID#1 for the D2D communication of the UE 100-1 and the information indicating the amount of non-transmitted data to the UE 100-1.

In step S107, on the basis of the cellular BSRs received in steps S103 and S104 and the D2D-BSRs received in steps S105 and S106, the eNB 200 performs assignment (scheduling) of each of the D2D radio resource and the cellular radio resource with respect to the UE 100-1 and the UE 100-2. For example, in order to prevent excess and deficiency from occurring in the D2D radio resource, the eNB 200 assigns an appropriate amount of D2D radio resource on the basis of the D2D-BSR. Furthermore, on the basis of the cellular BSRs and the D2D-BSRs, the eNB 200 assigns the D2D radio resource and the cellular radio resource in order to prevent uplink data transmission of the cellular communication and data reception in the D2D communication from being simultaneously performed.

In step S108, the eNB 200 transmits, to the UE 100-1, assignment information of each of the D2D radio resource and the cellular radio resource for the UE 100-1. For the transmission of the assignment information of the cellular radio resource, a cellular radio network temporary identifier (C-RNTI) is used. On the other hand, for the transmission of the assignment information of the D2D radio resource, the ID#1 for the D2D communication is used.

In step S109, the eNB 200 transmits, to the UE 100-2, assignment information of each of the D2D radio resource and the cellular radio resource for the UE 100-2. For the transmission of the assignment information of the cellular radio resource, the C-RNTI is used. On the other hand, for the transmission of the assignment information of the D2D radio resource, the ID#2 for the D2D communication is used.

As described above, according to the present embodiment, it is possible for the eNB 200 to perform efficient assignment (scheduling) of a radio resource in consideration of the amount of non-transmitted data in the D2D communication.

[Modification]

The aforementioned embodiment has considered the case in which the D2D communication is performed in a unicast manner. However, the present modification considers the case in which the D2D communication is performed in a multicast manner.

Figure 14:
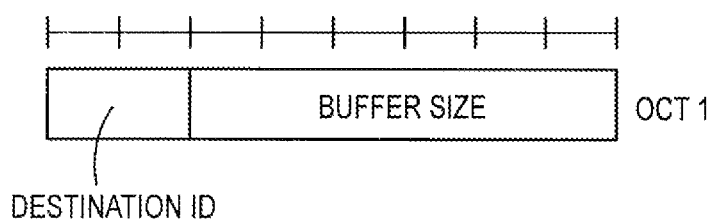
FIG. 14 is a diagram illustrating a format of the D2D-BSR according to a modification of the embodiment.

FIG. 14 is a diagram illustrating the format of the D2D-BSR according to the present modification.

As illustrated in FIG. 14, the D2D-BSR according to the present format includes a field for storing identification information of a communication partner UE of the D2D communication and a field for storing information indicating the amount of non-transmitted data to the communication partner UE, and includes the total 1 octet.

In the present format, the field of the identification information is configured to identify a plurality of communication partner UEs. For example, in the identification information, each communication partner UE is expressed by 1 bit in sequence of IDs for the D2D communication. The identification information includes a bit sequence in which a target UE is expressed by "1" and a non-target UE is expressed by "0".

In this case, when the upper limit number of UEs of a UE group performing the D2D communication is four, it is possible to configure the D2D-BSR of 1 octet by employing a field of a buffer size as four bits. Meanwhile, when the upper limit number of the UEs of a UE group performing the D2D communication is eight, it is possible to configure the D2D-BSR of 2 octets by storing a destination corresponding to eight UEs by 1 octet and employing a field of a buffer size as 1 octet.

OTHER EMBODIMENTS

Thus, the present invention has been described with the embodiments. However, it should not be understood that those descriptions and drawings constituting apart of this disclosure limit the present invention. From this disclosure, a variety of alternate embodiments, examples, and applicable techniques will become apparent to one skilled in the art.

The aforementioned embodiment has described the case in which the D2D scheduling is performed at the initiative of the eNB 200. However, the D2D scheduling may be performed at the initiative of the UE 100. Specifically, the eNB 200 notifies the UE 100 of radio resources available in the D2D communication, and the UE 100 determines a D2D radio resource from among the available radio resources. In the aforementioned operation environment, when the UE 100-2 performs the D2D scheduling, the eNB 200 transfers, to the UE 100-2, D2D-BSR that is received from the UE 100-1. Furthermore, the eNB 200 may transfer, to the UE 100-2, only a necessary part of the D2D-BSR that is received from the UE 100-1. On the basis of the D2D-BSR transferred from the eNB 200, the UE 100-2 performs the D2D scheduling.

Furthermore, in the aforementioned format of the D2D-BSR, an example, in which the identification information of the communication partner UE of the D2D communication is included in the D2D-BSR and only one LCG is defined for each communication partner UE, has been described. However, when a plurality of LCGs are defined also in the D2D communication, the same format as that of the cellular BSR may be applied to the D2D-BSR. In this case, it is possible for the UE 100 to transmit the D2D-BSR to each communication partner UE of the D2D communication and each LCG for the D2D communication.

In the aforementioned embodiment, the eNB 200 performs control relevant to the D2D communication; however, this configuration is not restrictive. For example, an upper network node (such as the MME) constituting the core network performs the control relevant to the D2D communication instead of the eNB 200. Thus, the network node may receive the D2D-BSR from the UE 100 via the eNB 200, and transmit, to the UE 100 via the eNB 200, assignment information of radio resource assigned on the basis of the D2D-BSR. As described above, a network device such as the eNB 200 and the MME performs the control relevant to the D2D communication.

Further, in the aforementioned embodiment, one example that the present invention is applied to the LTE system is described; however, the present invention is not limited to the LTE system, and the present invention may be applied to a system other than the LTE system.

In addition, the entire content of U.S. Provisional Application No. 61/719,623 (filed on Oct. 29, 2012) is incorporated in the present specification by reference.

INDUSTRIAL APPLICABILITY

As described above, the mobile communication system, the user terminal, the base station, the processor and the mobile communication method according to the present invention are capable of appropriately controlling the D2D communication, and thus they are useful in a mobile communication filed.

The invention claimed is:

1. A mobile communication system, comprising:
   a base station; and
   a user terminal that performs D2D communication under management of the base station, the D2D communication indicating direct device to device communication, wherein
   the user terminal transmits data to a plurality of D2D communication partner terminals in the D2D communication, and
   the user terminal transmits a D2D buffer status report to the base station,
   the D2D buffer status report including:
      an amount of non-transmitted data to each D2D communication partner terminal; and
      a plurality of identifiers corresponding to the plurality of D2D communication partner terminals, wherein the plurality of identifiers corresponding to the plurality of D2D communication partner terminals does not include the identifier of the base station to which the D2D buffer status report is transmitted.

2. The mobile communication system according to claim 1, wherein
   the user terminal transmits the D2D buffer status report to the base station separately from a buffer status report indicating an amount of non-transmitted data in cellular communication with the base station.

3. The mobile communication system according to claim 2, wherein
   the user terminal comprises: a D2D buffer that temporarily accumulates the non-transmitted data in the D2D communication separately from a buffer that temporarily accumulates the non-transmitted data in the cellular communication.

4. The mobile communication system according to claim 1, wherein
   when the base station performs assignment of a radio resource that is used in the D2D communication, the base station performs the assignment of the radio resource, which is used in the D2D communication, and assignment of a radio resource, which is used in the cellular communication, on the basis of the D2D buffer status report.

5. The mobile communication system according to claim 1, wherein
   when a D2D communication partner terminal of the user terminal in the D2D communication performs assignment of a radio resource that is used in the D2D communication, the base station transfers at least a part of the D2D buffer status report to the D2D communication partner terminal, and
   the D2D communication partner terminal performs the assignment of the radio resource, which is used in the D2D communication, on the basis of at least the part of the D2D buffer status report transferred from the base station.

6. The mobile communication system according to claim 1, wherein
   the plurality of identifiers corresponding to the plurality of D2D communication partner terminals, are assigned by the base station for the D2D communication.

7. A user terminal, comprising:
   a controller including a processor, which performs D2D communication under management of a base station, the D2D communication indicating direct device to device communication, wherein
   the controller transmits data to a plurality of D2D communication partner terminals in the D2D communication, and
   the controller transmits a D2D buffer status report to the base station, the D2D buffer status report including:
      an amount of non-transmitted data to each D2D communication partner terminal; and
      a plurality of identifiers corresponding to the plurality of D2D communication partner terminals, wherein the plurality of identifiers corresponding to the plurality of D2D communication partner terminals does not include the identifier of the base station to which the D2D buffer status report is transmitted.

8. A device comprising a processor, which is to be provided in a user terminal, wherein
   the processor performs D2D communication under management of a base station, the D2D communication indicating direct device to device communication, the processor further performing:
   a process of transmitting, by the user terminal, data to a plurality of D2D communication partner terminals in the D2D communication; and
   a process of transmitting, by the user terminal, a D2D buffer status report to the base station, the D2D buffer status report including:
      an amount of non-transmitted data to each D2D communication partner terminal; and
      a plurality of identifiers corresponding to the plurality of D2D communication partner terminals, wherein the plurality of identifiers corresponding to the plurality of D2D communication partner terminals does not include the identifier of the base station to which the D2D buffer status report is transmitted.

9. A base station, comprising:
   a controller including a processor, which manages D2D communication that is direct device to device communication, by a user terminal, wherein
   the controller receives a D2D buffer status report from the user terminal, the user terminal transmitting data to a plurality of D2D communication partner terminals in the D2D communication, and the D2D buffer status report including:
      an amount of non-transmitted data to each D2D communication partner terminal in the D2D communication; and
      a plurality of identifiers corresponding to the plurality of D2D communication partner terminals, wherein the plurality of identifiers corresponding to the plurality of D2D communication partner terminals does not include the identifier of the base station to which the D2D buffer status report is transmitted.

10. A device comprising a processor, which is to be provided in a base station, wherein the processor manages D2D communication that is direct device to device communication, by a user terminal, the processor performs a process of receiving, by the base station, a D2D buffer status report from the user terminal, the user terminal transmitting data to a plurality of D2D communication partner terminals in the D2D communication, and the D2D buffer status report including:
- an amount of non-transmitted data to each D2D communication partner terminal in the D2D communication; and
- a plurality of identifiers corresponding to the plurality of D2D communication partner terminals, wherein the plurality of identifiers corresponding to the plurality of D2D communication partner terminals does not include the identifier of the base station to which the D2D buffer status report is transmitted.

11. A communication control method in a mobile communication system, which includes a user terminal that performs D2D communication under management of a base station, the D2D communication indicating direct device to device communication, comprising:

transmitting, by the user terminal, data to a plurality of D2D communication partner terminals in the D2D communication; and transmitting, by the user terminal, a D2D buffer status report to the base station, the D2D buffer status report including:
- an amount of non-transmitted data to each D2D communication partner terminal in the D2D communication; and
- a plurality of identifiers corresponding to the plurality of D2D communication partner terminals, wherein the plurality of identifiers corresponding to the plurality of D2D communication partner terminals does not include the identifier of the base station to which the D2D buffer status report is transmitted.

12. The mobile communication system according to claim 1, wherein
the D2D buffer status report further includes identification information of logical channel group.

13. The mobile communication system according to claim 1, wherein
a format of the D2D buffer status report includes at least one buffer size field indicating the amount of non-transmitted data, and
a number of the buffer size field is changed based on a number of the D2D communication partner terminals.

* * * * *